(12) United States Patent
Dereure

(10) Patent No.: US 9,108,278 B2
(45) Date of Patent: Aug. 18, 2015

(54) METHOD OF USING AND RENOVATING A DISK FROM A STACK OF DISKS OF A VEHICLE BRAKE

(71) Applicant: MESSIER-BUGATTI-DOWTY, Velizy Villacoublay (FR)

(72) Inventor: Olivier Dereure, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 236 days.

(21) Appl. No.: 13/857,436

(22) Filed: Apr. 5, 2013

(65) Prior Publication Data
US 2013/0263419 A1     Oct. 10, 2013

(30) Foreign Application Priority Data

Apr. 6, 2012 (FR) .................................. 12 53211

(51) Int. Cl.
*B23P 6/00* (2006.01)
*F16D 65/12* (2006.01)
*F16D 55/36* (2006.01)
*F16D 55/00* (2006.01)

(52) U.S. Cl.
CPC . *B23P 6/00* (2013.01); *F16D 55/36* (2013.01); *F16D 65/12* (2013.01); *F16D 2055/0095* (2013.01); *F16D 2250/0092* (2013.01); *Y10T 29/49726* (2015.01); *Y10T 29/49732* (2015.01)

(58) Field of Classification Search
CPC ... B23P 6/00; F16D 2065/132; F16D 65/127; F16D 55/36; F16D 65/0043; Y10T 29/49723; Y10T 29/49726; Y10T 29/4973; Y10T 29/49734; Y10T 29/49737
See application file for complete search history.

(56) References Cited

U.S. PATENT DOCUMENTS

| | | | | |
|---|---|---|---|---|
| 2,071,788 A * | 2/1937 | Gillett | .......................... | 188/72.3 |
| 3,712,427 A | 1/1973 | Cook et al. | | |
| 4,977,985 A * | 12/1990 | Wells et al. | .................. | 188/71.1 |
| 4,982,818 A * | 1/1991 | Pigford | ........................ | 188/73.1 |
| 5,099,960 A | 3/1992 | Alev | | |
| 5,769,185 A | 6/1998 | Main et al. | | |
| 6,340,075 B1 * | 1/2002 | Bok et al. | ..................... | 188/71.7 |
| 7,168,528 B1 * | 1/2007 | Bok et al. | ..................... | 188/71.7 |
| 2004/0112687 A1 * | 6/2004 | McAfee et al. | .............. | 188/71.5 |
| 2010/0090059 A1 | 4/2010 | Johnson | | |

FOREIGN PATENT DOCUMENTS

| EP | 0398274 A1 * | 11/1990 |
|---|---|---|
| EP | 1052422 A2 * | 11/2000 |
| EP | 1103738 A1 * | 5/2001 |

OTHER PUBLICATIONS

French Search Report for French Patent Application No. 12 53211 dated Dec. 20, 2012.
French Written Opinion for French Patent Application No. 12 53211 dated Apr. 6, 2012.

* cited by examiner

*Primary Examiner* — Jermie Cozart
(74) *Attorney, Agent, or Firm* — Sughrue Mion, PLLC

(57) ABSTRACT

The invention relates to a method of using and renovating a disk (9) from a stack of disks (7) of a vehicle brake, the method comprising the steps of using the disk during a plurality of lives and of compensating for loss of thickness after each life by assembling the disk with a complementary portion.

8 Claims, 3 Drawing Sheets

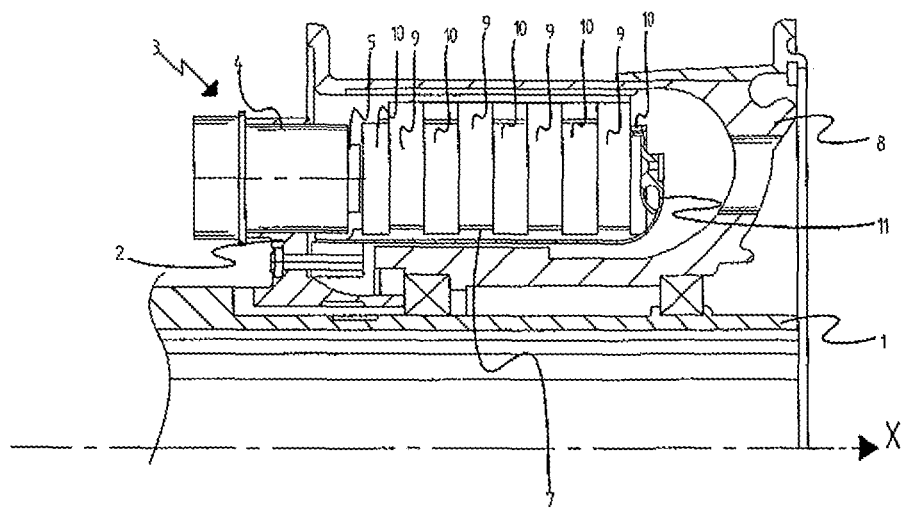
FIG 1
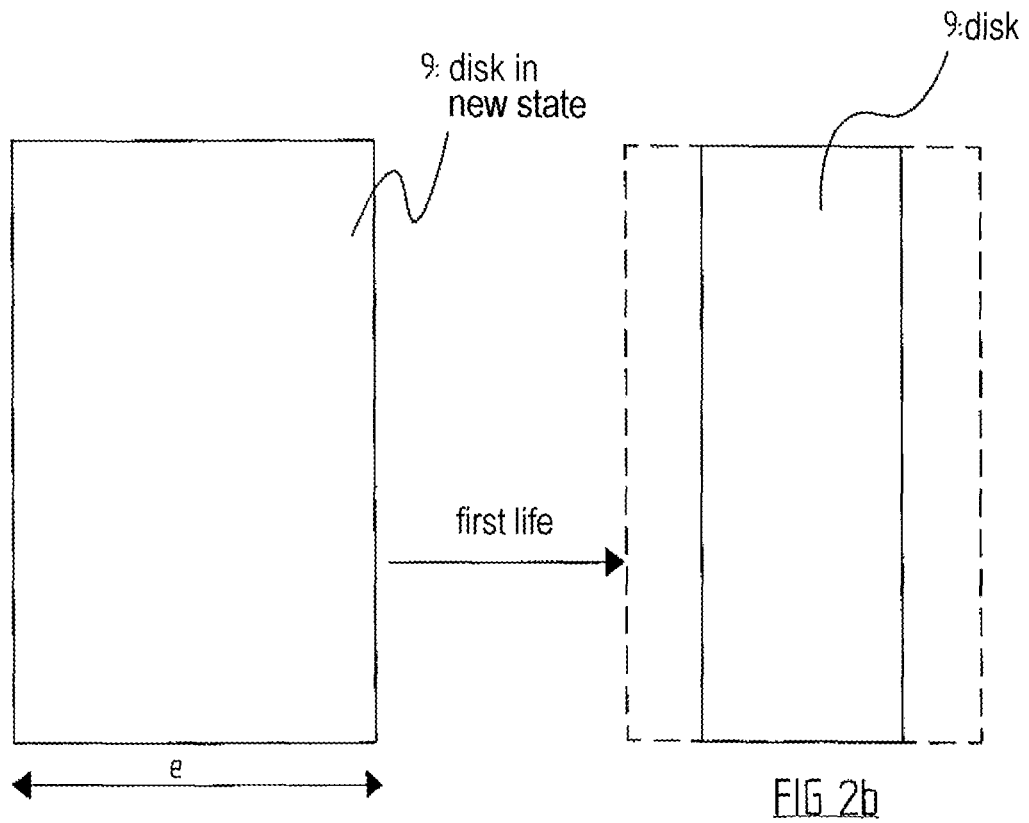
FIG 2a
FIG 2b

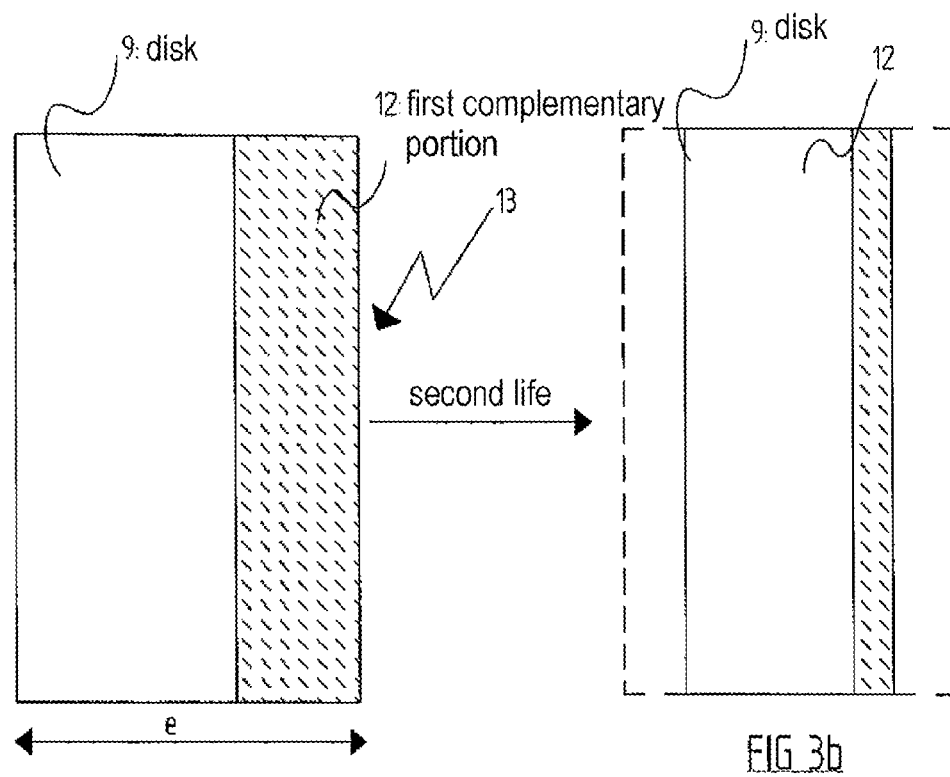
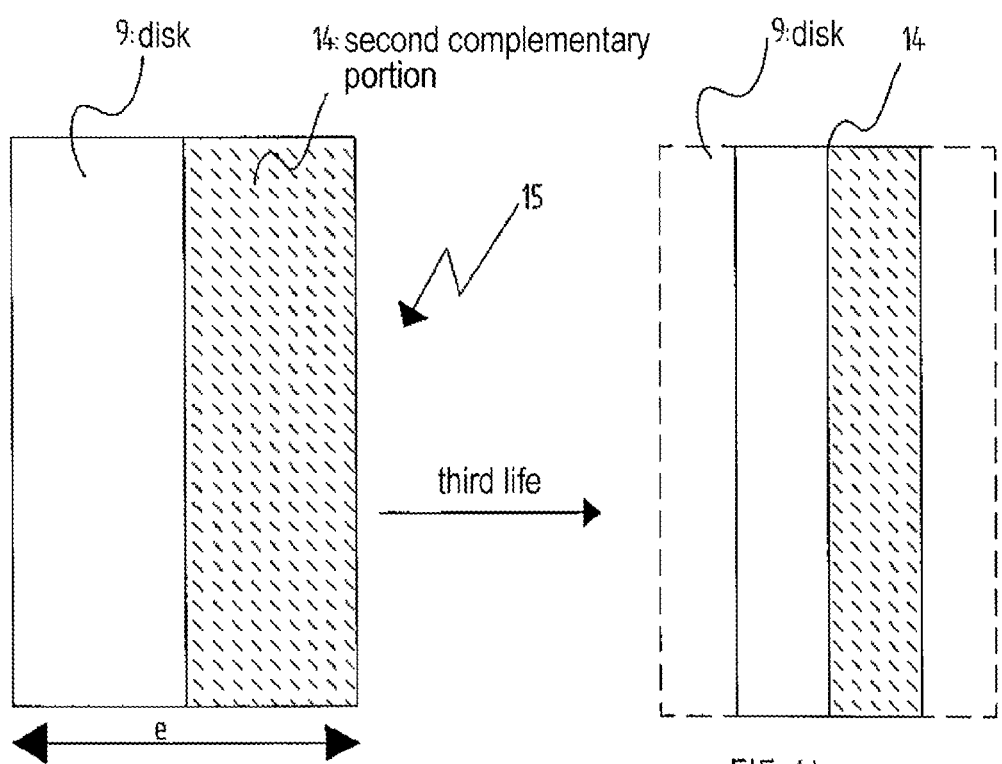

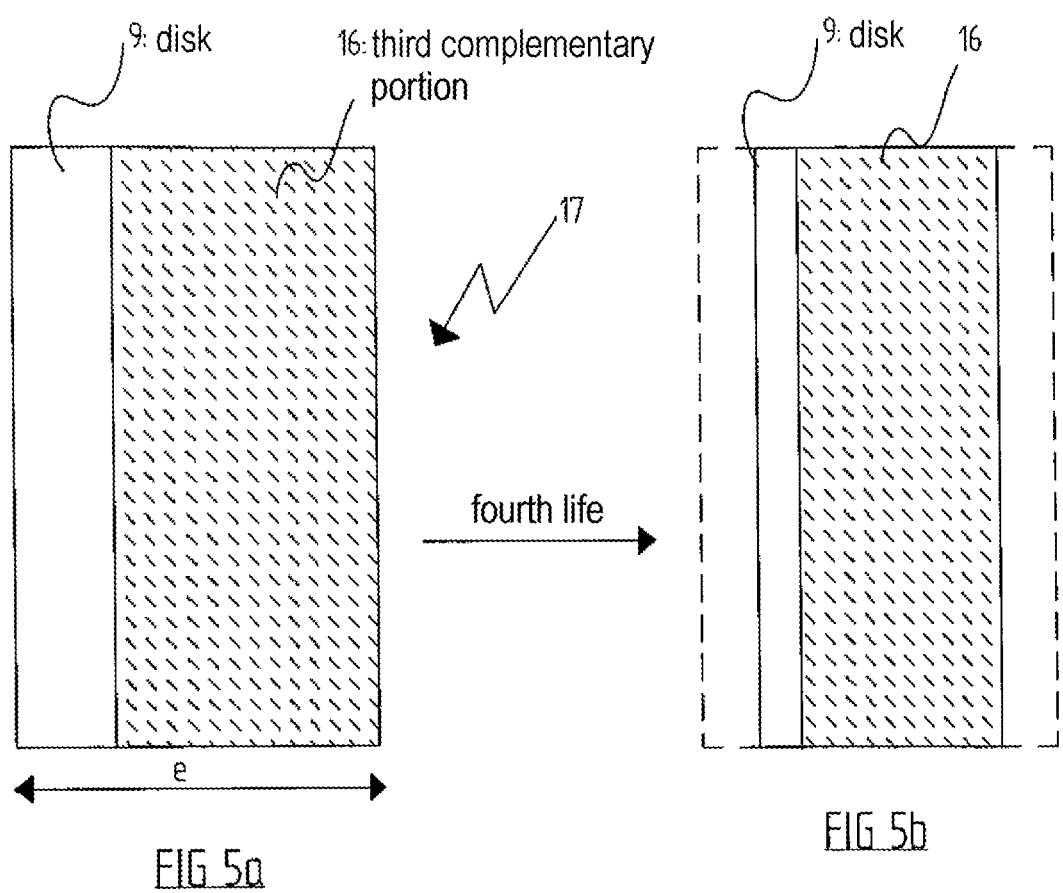

METHOD OF USING AND RENOVATING A DISK FROM A STACK OF DISKS OF A VEHICLE BRAKE

The invention relates to a method of using and renovating a disk from a stack of disks of a vehicle brake.

TECHNOLOGICAL BACKGROUND OF THE INVENTION

The braking systems of most modern aircraft comprise brakes having disks stacked around a torsion tube, together with braking actuators carried by a ring and controlled to apply a braking force on the disks in order to exert a braking torque on the braked wheels of the aircraft, tending to slow the aircraft down. Among the disks, a distinction is drawn between stator disks that are constrained in rotation with the torsion tube, and rotor disks that are constrained in rotation with the rim of the wheel.

During braking, the disks are subject to wear, which means that it is necessary to perform regular maintenance operations on the stack of disks in order to replace some or all of the disks in the stack so that the brake can continue to satisfy the imposed constraints on braking. Once the wear stroke of the brake stack has been used up, the stack of disks is removed from the brake and delivered to an inspection/renovation service.

In order to limit the frequency with which disks are replaced by new disks, it is thus known from document U.S. Pat. No. 7,900,751 to perform a method of renovating and using a disk from a stack of disks of a brake, which method includes a step of using the disk during two or three lives and of compensating for a reduction in the thickness of the disk after each life by assembling the disk with a complementary portion.

OBJECT OF THE INVENTION

An object of the invention is to provide a method of using and renovating a disk from a stack of disks, which method enables worn disks to be reused to a greater extent.

BRIEF DESCRIPTION OF THE INVENTION

In order to achieve this object, the invention provides a method of using and renovating a disk from a stack of disks of a vehicle brake, the method comprising the steps of using the disk during a plurality of lives and of compensating a reduction in thickness after each life by assembling the disk with a complementary portion, in compliance with the following arrangements:
  after a first life, at the end of which the disk has a thickness lying in the range 60% to 90% of an initial thickness of the disk, surfacing both faces of the disk and assembling it on one side with a first complementary portion so that the assembly has a thickness substantially equal to the initial thickness of the disk;
  after a second life, at the end of which the disk has a thickness greater than 50% of the initial thickness, surfacing the disk to a thickness substantially equal to 50% of the initial thickness and assembling it with a second complementary portion so that the assembly has a thickness substantially equal to the initial thickness of the disk;
  after a third life, at the end of which the disk has a thickness lying in the range 40% to 10% of the initial thickness, surfacing the disk and assembling it with a third complementary portion so that the assembly has a thickness substantially equal to the initial thickness of the disk; and
  after a fourth life, discarding the disk.

As a result, the disk is used during four lives before it is necessary to replace it with a new disk. The lifetime of the disk is thus optimized.

Advantageously, by assembling the disk with a complementary portion, there is no need to modify the remainder of the stack of disks or the means for connecting the stack of disks to the wheel or to the torsion tube, since the assembly of the disk with the associated complementary portion conserves the same thickness as the initial thickness of the disk.

Throughout this application, the term "life" is used to designate a cycle of use of the disk in a stack of disks while the stack of disks is mounted on the vehicle and is subjected to successive braking operations, a life beginning when the stack of disks is mounted on the vehicle and ending when the stack of disks is removed from the vehicle and is sent to a workshop for inspection and maintenance.

Similarly, the term "disk" is used to mean the generally annular friction element that presents the initial thickness at the beginning of the first life and that is subjected to wear on its rubbing faces during each of the following lives, which wear gives rise to a reduction in its thickness.

Similarly, the term "assemble" is used to mean adding a complementary portion to the disk at the beginning of the second, third, and fourth lives in such a manner that each assembly of a complementary portion and of the disk presents a thickness that is substantially equal to the initial thickness. The term "complemented disk" is used to mean the assembly of the disk together with a corresponding complementary portion.

Thickness is said to be "substantially equal" for a thickness that has a value close to the specified value, typically in a range within 5% of the specified thickness.

BRIEF DESCRIPTION OF THE DRAWINGS

The invention can be better understood in the light of the following description given with reference to the figures of the accompanying drawings, in which:
  FIG. 1 is a section view of an electromechanical brake;
  FIGS. 2a and 2b are diagrams showing a disk of the stack of disks of the brake shown in FIG. 1, respectively at the beginning and at the end of the first life;
  FIGS. 3a and 3b are diagrams showing the disk shown in FIG. 1 when assembled with a complementary portion, respectively at the beginning and at the end of the second life;
  FIGS. 4a and 4b are diagrams showing the disk of FIG. 1 assembled with a complementary portion, respectively at the beginning and at the end of the third life; and
  FIGS. 5a and 5b are diagrams showing the disk of FIG. 1 assembled with a complementary portion, respectively at the beginning and at the end of the fourth life.

DETAILED DESCRIPTION OF THE INVENTION

FIG. 1 shows a brake that is for braking an aircraft wheel mounted on an axle 1 of axis X.

The brake comprises a ring 2 mounted on the axle 1 and prevented from rotating relative thereto by means that are not shown. The ring 2 carries actuators 3 (only one of which is shown in FIG. 1), each comprising a housing 4 in which a pusher 5 is mounted to slide along an axial direction parallel to the axis X and to exert a braking force selectively on a stack of disks 7 comprising an alternation of rotor disks 9 constrained to rotate with a rim 8 of the wheel and of stator disks 10 that are prevented from rotating by a torsion tube 11 secured to the ring 2.

By way of example, the pusher 5 may be actuated by an electric motor of the associated actuator, the motor being arranged to cause one of the elements of a screw-and-nut system to rotate, e.g. a system of the ball or of the roller type, the pusher being secured to the other one of the elements of the system. An anti-rotation member then prevents the pusher 5 from rotating.

Applying a braking force causes the disks in the stack of disks 7 to rub against one another so that a fraction of the kinetic energy of the aircraft is dissipated as heat. Nevertheless, the friction between the disks inevitably leads to wear of the various faces of the rotor disks 9 and of the stator disks 10 that rub against one another.

FIG. 2*a* shows one of the rotor disks 9 of the stack of disks 7. At the beginning of a first life, said disk 9 presents an initial thickness e. The disk 9 is then a one-piece disk. The disk 9 is then used as such during the first life in the stack of disks 7.

During said first life, the disk 9 wears down, in a manner that is substantially uniform on both of its faces, thereby leading to a reduction in the initial thickness e.

Thus, with reference to FIG. 2*b*, at the end of the first life, i.e. when the stack of disks 7 is removed from the aircraft, the disk 9 has thickness lying in the range 60% to 90% of the initial thickness e. The reduction in the thickness of the disk 9 during the first life is represented by dashed lines.

With reference to FIG. 3*a*, the two faces of the disk 9 are then surfaced in order to improve the surface state of said faces.

In order to compensate for the reduction in the thickness of the disk 9, mainly as a result of the wear as suffered during the first life, but also as a result of surfacing, the disk 9 is assembled with a first complementary portion 12.

Methods of assembling a disk with a complementary portion are well-known in the prior art and are not described in greater detail herein. By way of example, the disk and the complementary portion are assembled together by adhesive or indeed by clipping using clips riveted to the disk and to the complementary portion.

The assembly 13 made up of the disk 9 and the first complementary portion 12 then has thickness that is substantially equal to the initial thickness e.

The complemented disk 13 is then used as a rotor disk in a new stack of disks (not shown). The disk 9 is thus used in the stack of disks during a second life.

During said second life, the complemented disk 13 wears in substantially uniform manner on both of its faces, i.e. uniformly on one of the faces of the disk 9 and on one of the faces of the first complementary portion 12, thereby reducing the thickness of the complemented disk 13 and thus of the disk 9.

Thus, with reference to FIG. 3*b*, at the end of the second life, the disk 9 has a thickness that is greater than 50% of the initial thickness e. Preferably, at the end of the second life, the disk 9 has thickness that is substantially equal to 50% of the initial thickness e, but nevertheless greater than 50% of the initial thickness e.

The reduction in the thickness of the disk 9 during the second life is represented by dashed lines.

With reference to FIG. 4*a*, surfacing is performed on at least the face of the disk 9 that has been in contact with one of the rotor disks 10 in the stack of disks during the second life. Preferably, both of the faces of the disk 9 are surfaced.

In any event, the disk 9 is surfaced until the disk 9 has thickness that is substantially equal to 50% of the initial thickness, but that is nevertheless greater than 50% of the initial thickness e.

The reduction in the thickness of the disk 9 between the beginning and the end of the second life can be compensated by assembling the disk 9 with a second complementary portion 14 that presents a thickness substantially equal to the thickness of the disk 9 once the surfacing step has been performed. Clearly, it is the disk 9 on its own that is complemented with the second complementary portion 14. It is not the disk 9 plus the first complementary portion 12 that are complemented by the second complementary portion 14.

The assembly 15 constituted by the disk 9 with the second complementary portion 14 thus has thickness substantially equal to the initial thickness e.

The complemented disk 15 is then used as a rotor disk in a new stack of disks (not shown). The disk 9 is thus used in the stack of disks during a third life.

During this third life, the complemented disk 15 wears in substantially uniform manner on both of its faces, i.e. in uniform manner on one of the faces of the disk 9 and on one of the faces of the second complementary portion 14, thereby leading to a reduction in the thickness of the complemented disk 15 and thus of the disk 9.

Thus, with reference to FIG. 4*b*, at the end of the third life, the disk 9 has thickness lying in the range 40% to 10% of the initial thickness e. The reduction in the thickness of the disk 9 during the third life is represented by dashed lines.

With reference to FIG. 5*a*, surfacing is performed on at least the face of the disk 9 that was in contact with one of the stator disks 10 in the stack of disks during the third life. Preferably, both faces of the disk 9 are surfaced.

In order to compensate for the reduction in thickness of the disk 9 between the beginning and the end of the third life, the disk 9 is assembled with a third complementary portion 16. The assembly 17 made up of the disk 9 together with the third complementary portion 16 thus has thickness substantially equal to the initial thickness e. Naturally, the disk 9 is complemented solely with the third complementary portion 16.

The complemented disk 17 is then used as a rotor disk in a new stack of disks (not shown). The disk 9 is thus used in the stack of disks during a fourth life.

During said fourth life, the complemented disk 17 wears in substantially uniform manner on both of its faces, i.e. in uniform manner on one of the faces of the disk 9 and on one of the faces of the third complementary portion 16, thereby reducing the thickness of the complemented disk 17 and thus of the disk 9.

With reference to FIG. 5*b*, at the end of the fourth life, the disk 9 is finally rejected, since the thickness of the disk 9 at the end of the fourth life prevents it from being used during a fifth life.

The reduction in the thickness of the disk 9 during the fourth life is represented by dashed lines.

In a preferred implementation, the second complementary portion 14 is another disk at the beginning of its third life in the method of the invention.

In a preferred implementation, the disk 9 at the beginning of the second life and at the beginning of the fourth life presents thicknesses that are complementary, i.e. the thickness of the disk 9 at the beginning of the second life plus the thickness of the disk 9 at the beginning of the fourth life is substantially equal to the initial thickness e.

The first complementary portion 12 is then preferably another disk at the beginning of its fourth life in the method of the invention.

In the same manner, and preferably, the third complementary portion 16 is then another disk at the beginning of its second life in the method of the invention.

In still more preferred manner, the utilization and surfacing steps are performed in such a manner that:
- the disk at the beginning of the second life has thickness substantially equal to 70% of the initial thickness e; and
- the disk at the beginning of the fourth life has thickness substantially equal to 30% of the initial thickness e.

The first complementary portion 12 is then preferably another disk at the beginning of its fourth life, the third complementary portion 16 another disk at the beginning of its second life, and the second complementary portion 14 another disk at the beginning of its third life.

There is thus no need to act directly to produce complementary portions of appropriate thicknesses. These complementary portions may be obtained by surfacing other disks at the ends of their first life, second life, and third life.

Naturally, the invention is not limited to the implementation described, and variants may be applied thereto without going beyond the ambit of the invention as defined by the claims. In particular, the method of the invention may be implemented by using disks of other types.

For example, although the method is implemented in the present description on intermediate disks of the rotor type, the method could equally well be implemented on intermediate disks of the stator type. The term "intermediate disk" is naturally used to mean a disk in the stack of disks that is not located at either of the ends of the stack of disks.

In a preferred implementation, for a stator disk situated at one end of the stack of disks, either the disk against which the pusher bears or else the disk against which a portion of the torsion tube rests, said end disk is used at least during a first life before being surfaced to be used as a second complementary portion of an intermediate rotor or stator disk.

Preferably, said disk is used successively during a first life and a second life without surfacing and without being complemented. At the end of the second life, said disk is surfaced so that it can be used as a second complementary portion of an intermediate rotor or stator disk.

In a variant, said disk could be used in succession during a plurality of successive lives without being used or complemented before being discarded or before being surfaced in order to be used as a second complementary portion of an intermediate rotor or stator disk or before being surfaced in order to be used as a complementary portion of another end disk that has already been used during at least one life.

The disk may be made of any material that is suitable for braking, e.g. carbon. The material of the complementary portions is preferably the same as the material of the disk. The disks in a stack of disks, regardless of whether they are rotor or stator disks, are preferably of the same material so that the various rubbing faces of the intermediate disks are worn in substantially identical manner. The initial thicknesses should preferably be defined accordingly.

The method is also applicable to disks for vehicle brakes other than aircraft brakes. The method is also applicable to brakes other than an electromechanical brake, such as for example an electrical brake or indeed a hydraulic brake.

The invention claimed is:

1. A method of using and renovating a disk from a stack of disks of a vehicle brake, the method comprising the steps of using the disk during a plurality of lives and of compensating a reduction in thickness after each life by assembling the disk with a complementary portion, in compliance with the following arrangements:
   after a first life, at the end of which the disk has a thickness lying in the range 60% to 90% of an initial thickness of the disk, surfacing both faces of the disk and assembling the disk on one side with a first complementary portion so that the assembly has a thickness substantially equal to the initial thickness of the disk;
   after a second life, at the end of which the disk has a thickness greater than 50% of the initial thickness, surfacing the disk to a thickness substantially equal to 50% of the initial thickness and assembling the disk with a second complementary portion so that the assembly has a thickness substantially equal to the initial thickness of the disk;
   after a third life, at the end of which the disk has a thickness lying in the range 40% to 10% of the initial thickness, surfacing the disk and assembling the disk with a third complementary portion so that the assembly has a thickness substantially equal to the initial thickness of the disk; and
   after a fourth life, discarding the disk.

2. The method according to claim 1, wherein the disk presents thicknesses at the beginning of the second life and at the beginning of the fourth life that are complementary.

3. The method according to claim 2, wherein the first complementary portion is another disk at the beginning of its fourth life.

4. The method according to claim 2, wherein the third complementary portion is another disk at the beginning of its second life.

5. The method according to claim 1, wherein the second complementary portion is another disk at the beginning of its third life.

6. A method according to claim 1, wherein, at the end of the first life, the disk is surfaced to a thickness of 70% of the initial thickness, and wherein, at the end of the third life, the disk is surfaced to a thickness of 30% of the initial thickness.

7. A method of using and renovating a stack of disks of a vehicle brake, the stack of disks comprising a first end disk against which a brake pusher bears in operation, intermediate disks, and a second end disk against which a torsion tube of the brake bears in operation, the method comprising the steps of:
   using and renovating intermediate disks in accordance with a method comprising the steps of using a disk during a plurality of lives and of compensating a reduction in thickness after each life by assembling the disk with a complementary portion, in compliance with the following arrangements:
      after a first life, at the end of which the disk has a thickness lying in the range 60% to 90% of an initial thickness of the disk, surfacing both faces of the disk and assembling the disk on one side with a first complementary portion so that the assembly has a thickness substantially equal to the initial thickness of the disk;
      after a second life, at the end of which the disk has a thickness greater than 50% of the initial thickness, surfacing the disk to a thickness substantially equal to 50% of the initial thickness and assembling the disk with a second complementary portion so that the assembly has a thickness substantially equal to the initial thickness of the disk;
      after a third life, at the end of which the disk has a thickness lying in the range 40% to 10% of the initial thickness, surfacing the disk and assembling the disk with a third complementary portion so that the assembly has a thickness substantially equal to the initial thickness of the disk; and after a fourth life, discarding the disk; and using the first end disk at least during a first life without complementing the first end disk or surfacing the first end disk, and at the end of one of the lives of the first end disk, surfacing the first end disk in order to form a second complementary portion.

8. The method according to claim 7, further including the step of using the second end disk at least during a first life without complementing the second end disk or surfacing the second end disk, and at the end of one of the lives of the second end disk, surfacing the second end disk in order to form a second complementary portion.

\* \* \* \* \*